(12) United States Patent
Dubus (10) Patent No.: US 11,248,690 B2
(45) Date of Patent: Feb. 15, 2022

(54) ROLLER SCREW MECHANISM

(71) Applicant: Jérôme Dubus, Aix les Bains (FR)

(72) Inventor: Jérôme Dubus, Aix les Bains (FR)

( * ) Notice: Subject to any disclaimer, the term of this patent is extended or adjusted under 35 U.S.C. 154(b) by 77 days.

(21) Appl. No.: 16/623,253

(22) PCT Filed: Jun. 18, 2018

(86) PCT No.: PCT/FR2018/051447
§ 371 (c)(1),
(2) Date: Dec. 16, 2019

(87) PCT Pub. No.: WO2018/234674
PCT Pub. Date: Dec. 27, 2018

(65) Prior Publication Data
US 2021/0148442 A1  May 20, 2021

(30) Foreign Application Priority Data

Jun. 19, 2017 (FR) ........................................ 1755568

(51) Int. Cl.
*F16H 25/20* (2006.01)
*F16H 25/22* (2006.01)
(52) U.S. Cl.
CPC ................................ *F16H 25/2252* (2013.01)
(58) Field of Classification Search
CPC ............. F16H 25/2252; F16H 25/2247; F16H 2025/2084
See application file for complete search history.

(56) References Cited

U.S. PATENT DOCUMENTS 2,683,379 A * 7/1954 Strandgren ......... F16H 25/2252
74/424.92
3,182,522 A * 5/1965 Strandgren ............. F16B 37/12
74/424.92
(Continued)

FOREIGN PATENT DOCUMENTS

DE        1043743 B    11/1958
FR        2984443 A1    6/2013
FR        3036451 A1   11/2016

OTHER PUBLICATIONS

Preliminary Search Report issued in French Application FR1755568 Date of Completion of Search: Feb. 20, 2018.
(Continued)

*Primary Examiner* — Zakaria Elahmadi
(74) *Attorney, Agent, or Firm* — Ware, Fressola, Maguire & Barber LLP (57) ABSTRACT

The invention relates to a roller screw mechanism comprising a screw (110) provided with an external thread; a nut (130) coaxially surrounding the screw (130) and provided with an internal thread; and rollers (120), each of which is provided with an external thread, each roller (120) being interposed between the screw (110) and the nut (130) so that the threads of the rollers mesh with the threads of the screw and of the nut; said roller screw mechanism being characterized in that the threads of the rollers are complementary to the threads of the screw and of the nut so that, at zero load, the threads of the rollers co-operate on both of their flanks with the threads of the screw and of the nut in a contact geometry having curvilinear segments.

12 Claims, 5 Drawing Sheets

(56) References Cited

U.S. PATENT DOCUMENTS

| | | | | |
|---|---|---|---|---|
| 3,226,809 | A * | 1/1966 | Perrin | F16H 25/2252 |
| | | | | 29/893.31 |
| 3,406,584 | A * | 10/1968 | Roantree | F16H 25/2252 |
| | | | | 74/424.92 |
| 9,267,588 | B2 * | 2/2016 | Buvril | F16H 25/2252 |
| 9,759,298 | B2 * | 9/2017 | Abevi | F16H 25/2252 |
| 10,781,900 | B2 * | 9/2020 | Dubus | F16H 25/14 |
| 2003/0121655 | A1 * | 7/2003 | Lauritzen | E21B 23/00 |
| | | | | 166/207 |
| 2004/0082431 | A1 * | 4/2004 | Maydew | B64C 13/34 |
| | | | | 475/331 |
| 2004/0244520 | A1 * | 12/2004 | Cornelius | F16H 25/2252 |
| | | | | 74/424.92 |
| 2011/0303030 | A1 * | 12/2011 | Okamoto | F16H 25/2266 |
| | | | | 74/89.23 |
| 2012/0042741 | A1 * | 2/2012 | Jacob | F16H 57/0464 |
| | | | | 74/89.44 |
| 2012/0240374 | A1 * | 9/2012 | Kinoshita | F16H 19/02 |
| | | | | 29/407.1 |

OTHER PUBLICATIONS

International Search Report issued in international application No. PCT/FR2018/051447, entitled "Roller Screw Mechanism" dated Oct. 15, 2018.

\* cited by examiner

ROLLER SCREW MECHANISM

RELATED APPLICATIONS

This application is the U.S. National Stage of International Application No. PCT/FR2018/051447, filed Jun. 18, 2018, which designates the U.S., published in French, and claims priority under 35 U.S.C. § 119 or 365(c) to French Application No. 17 555 68, filed Jun. 19, 2017. The entire teachings of the above applications are incorporated herein by reference.

TECHNICAL FIELD

The invention relates to the field of roller screw mechanisms, which make it possible to transform a movement in rotation into a movement in translation, and vice versa.

PRIOR ART

A roller screw mechanism typically comprises a screw, a nut disposed coaxially around the screw, and a plurality of rollers interposed between the screw and the nut, and having their longitudinal axes parallel to the axis of the screw. The screw and the rollers are provided with external threads, and the nut is provided with an internal thread. The threads of the rollers are in engagement with the threads of the screw and of the nut.

Patent FR 2 980 545 discloses devices having this configuration, and more particularly it discloses a planetary roller screw mechanism and a recirculating roller screw mechanism. The contact zones comply with point contact geometries that are obtained by thread profiles that are not complementary to one another. In Patent FR 2 980 545, the threads of the rollers have convex flanks that are in contact with straight segments of the threads of the screw and of the nut.

SUMMARY OF THE INVENTION

The contact zones of the roller screw mechanisms that have been developed so far are limited, at zero loads, to point contact geometries. Unfortunately, the point contact nature of those contact zones means that, in practice, small areas bear the mechanical forces that are exerted while the roller screw mechanisms are being used, thereby limiting their load capacities and/or their life spans.

An object of the invention is to push back the limits of roller screw mechanisms by using a curvilinear contact geometry.

To this end, the invention provides a roller screw mechanism comprising:
  a screw provided with an external thread;
  a nut coaxially surrounding the screw and provided with an internal thread; and
  rollers, each of which is provided with an external thread, each roller being interposed between the screw and the nut so that the threads of the rollers mesh with the threads of the screw and of the nut, said roller screw mechanism being characterized in that the threads of the rollers are complementary to the threads of the screw and of the nut so that, at zero load, the threads of the rollers co-operate on both of their flanks with the threads of the screw and of the nut in a contact geometry having curvilinear segments, and the rollers come into contact respectively with the screw and with the nut along contact segments lying in planes that are offset angularly relative to a midplane of the mechanism that contains a longitudinal axis of the screw and a longitudinal axis of the roller in question.

In such a mechanism, based on curvilinear contact geometries, the forces are distributed over areas that are larger than in point contact geometries. Therefore, load capacities that are extremely high and/or life spans that are much longer can be obtained. Persons familiar with the field will understand that advances per turn that are larger and/or optimizations of weight, of volume, of efficiency, and of reliability also become achievable.

The roller screw mechanism of the invention may advantageously have the following characteristics:
  at the contact zones, in a first embodiment:
    the threads of the rollers may have straight profiles; and
    the threads of the rollers may come into contact with the threads of the screw and of the nut along straight line segments;
  at the contact zones, in a second embodiment:
    the threads of the rollers may come into contact with the threads of the screw and of the nut along curve segments; and
    the threads of the rollers may have convex profiles and the threads of the screw and of the nut may have concave profiles; or
    the threads of the rollers may have concave profiles and the threads of the screw and of the nut may have convex profiles;
  an advance per turn of the mechanism may lie in the range zero times the diameter of the screw to one time the diameter of the screw;
  an advance per turn of the mechanism may lie in the range greater than one time the diameter of the screw to four times the diameter of the screw; and
  if consideration is given to an engagement distance defined as a first difference in distances to the longitudinal axis of the screw between a crest of the thread of one of the rollers and a crest of the thread of the screw when the roller screw mechanism is assembled, and if consideration is given to a second difference in distances to the longitudinal axis of the screw between the two ends of the contact segment between the screw and one of the rollers, then said second difference in distances is equal to at least 10% of said engagement distance.

The invention further provides an actuator device including a roller screw mechanism, e.g. for transforming a movement in rotation into a movement in translation or vice versa.

In the description below, a contact geometry having curvilinear segments should be understood to mean that a contact between two surfaces takes place substantially continuously along a straight line segment or a curved line segment connecting up two points.

In this document, a profile of an element is defined by a surface of the element intersecting a contact plane, and two profiles are said to be complementary to each other when a portion of one of the profiles can be described by a segment of a straight line or of a curved line that is reciprocal to a straight line or curved line segment that describes a portion of the other profile.

Thus, two mechanical elements having two mutually complementary profiles can be put into contact in a contact geometry having a curvilinear segment, the contact taking place continuously along a straight line or curved line segment at portions of the two elements having profiles that are complementary to each other and can be described, in those portions, by two straight line or curved line segments that are reciprocal to each other.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF A FIRST EMBODIMENT

The roller screw mechanism of the invention is based on using threads having profiles that are functions of one another, and more particularly profiles that are complementary to one other another.

In this embodiment, the threads of the rollers have flanks that have straight profiles in the contact zones in which they are in contact with the screw and with the nut, and come into contact with the threads of the screw and of the nut along straight line segments.

In a situation of contact between two helical surfaces (outside surface of a screw or of a roller or inside surface of a nut) taking place along a straight line segment, the contact plane is the plane containing the normal common to the two interacting surfaces and the straight line segment. This contact plane is perpendicular to the tangential plane common to the two surfaces and is, in the roller screw mechanism of the invention, distinct from the midplanes formed by the two longitudinal axes of said helical surfaces.

This geometry can be seen in FIGS. 1A, 1B, 1C, 2A, 2B, 3A, 3B, 4A, 4B, and 5A.

Figure 1A:
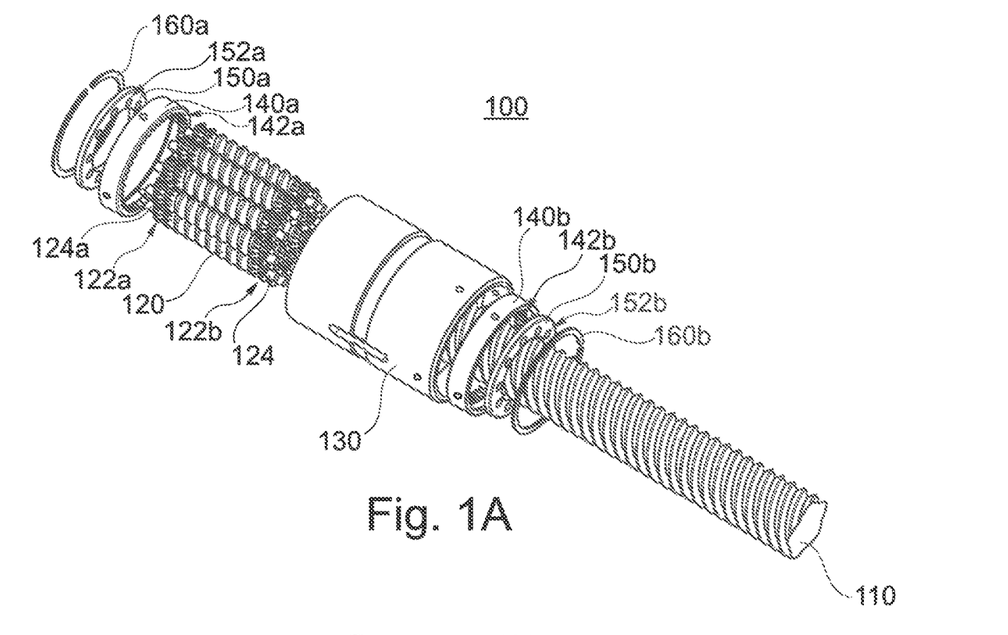
FIG. 1A is an exploded view of a planetary roller screw mechanism comprising a screw, rollers, and a nut.
Figure 1B:
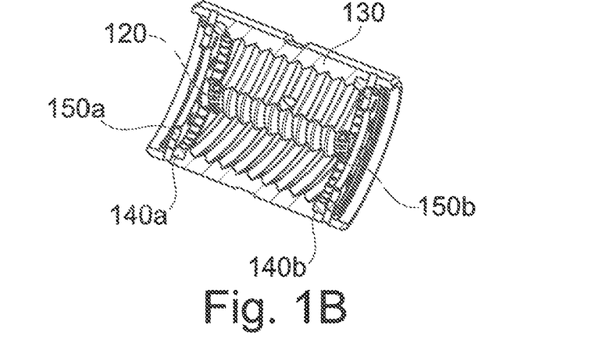
FIGS. 1B and 1C show the relative positioning of elements of the mechanism shown in FIG. 1A, in a section that is a midplane section for FIG. 1C.
Figure 1C:
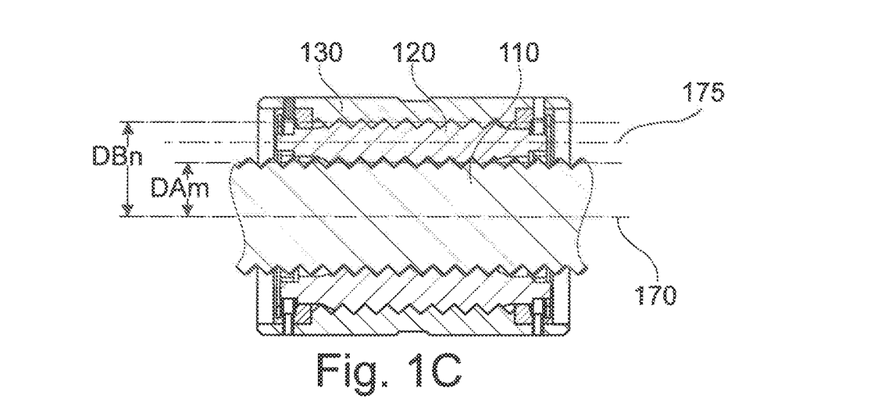

FIGS. 1A and 1C show a planetary roller screw mechanism, taken as an example for illustrating the main component elements of a roller screw mechanism.

It should be understood that neither the invention nor the present embodiment are limited to this particular situation.

The term "roller screw" refers not only to planetary roller screws but also to zero-pitch roller screws, to grooved or recirculating roller screws, to inverted roller screws, and to differential roller screws.

The essential characteristic of roller screws is that the screw and the nut interact via the rollers by means of the contact zones between the threads of the rollers and the threads of the screw and of the nut.

As shown in FIGS. 1A to 1C, a roller screw mechanism 100 typically comprises a screw 110, a nut 130 disposed coaxially around the screw, and a plurality of rollers 120 interposed between the screw and the nut, and having their longitudinal axes parallel to the axis of the screw.

The screw and the rollers are provided with external threads, and the nut is provided with an internal thread. The threads of the rollers are in engagement with the threads of the screw and of the nut.

In addition to the elements listed above, a roller screw mechanism further comprises a roller holder device.

In a planetary roller screw mechanism like the one shown in FIG. 1A, the holder device comprises: two bands 140a and 140b provided with respective internal sets of teeth 142a and 142b that mesh with external sets of teeth 122a and 122b that are situated at the ends of the rollers 120; annular rings 150a and 150b mounted between the screw and the bands, and provided with cylindrical through holes 152a and 152b that receive journals 124a and 124b extending the ends of the corresponding rollers; and retaining rings 160a and 160b, each of which is mounted in a groove provided in a corresponding band in such a manner as to hold the annular rings.

While the screw is rotating, the rollers turn about their own axes and about the screw, and drive the nut so that it moves in translation. FIG. 1C shows longitudinal section planes, i.e. section planes that are parallel to the longitudinal axis 170 of the screw of the mechanism of FIG. 1A.

Longitudinal sections Am that are orthogonal to the plane of the figure are situated at distances DAm from the longitudinal axis 170 of the screw, and intersect the straight line segments along which the threads of one of the rollers and of the screw come into contact, where m represents an identification index.

Similarly, longitudinal sections Bn that are orthogonal to the plane of the figure are situated at distances DBn from the axis 170 of the screw, and intersect the straight line segments along which the threads of one of the rollers and of the nut come into contact, where n represents an identification index.

Figure 2A:
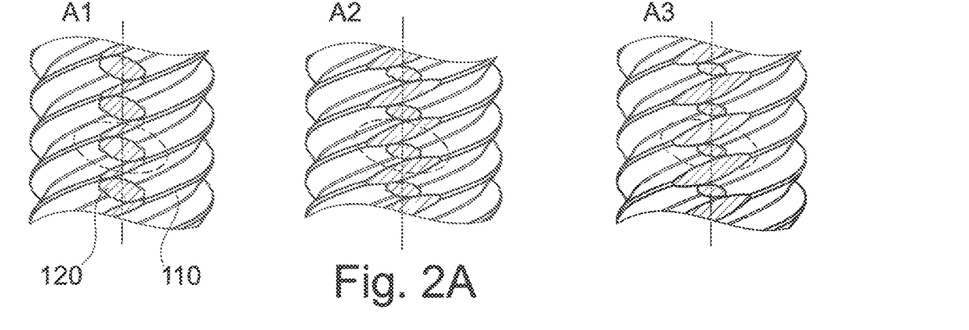
FIG. 2A shows longitudinal sections of the FIG. 1A mechanism at different distances from the axis of the screw, and shows curvilinear screw-roller contact interfaces.
Figure 2B:
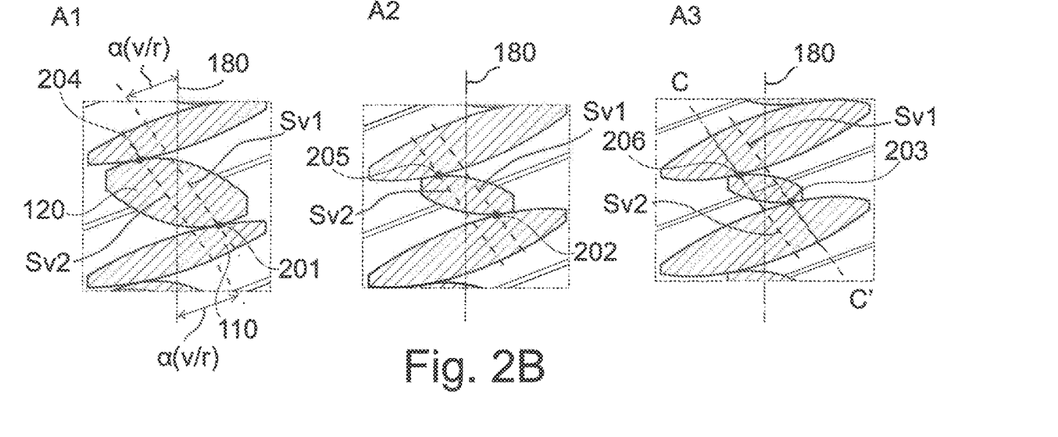
FIGS. 2B and 2C show, respectively, enlargements of the section views shown in FIG. 2A and a comparative example for a conventional situation of point contacts.

As regards the screw-roller interface, three sections A1, A2, and A3 as defined above at respective ones of three distances DA1, DA2, and DA3 are shown in FIG. 2A, where DA1<DA2<DA3. FIG. 2B shows enlargements of the regions surrounded by dashed lines in FIG. 2A, and shows the contact points 201, 202, and 203 in a first contact plane Sv1 between a first flank of the thread of the roller 120 and the thread of the screw 110, and the contact points 204, 205, and 206 in a second contact plane Sv2 between a second flank of the thread of the roller 120 and the thread of the screw 110, these contact points being marked by solid disks, at different distances from the axis of the screw 110. These contact points correspond to the intersections where the straight line segments of contact between the roller and the screw intersect the section planes A1, A2, and A3.

Figure 3A:
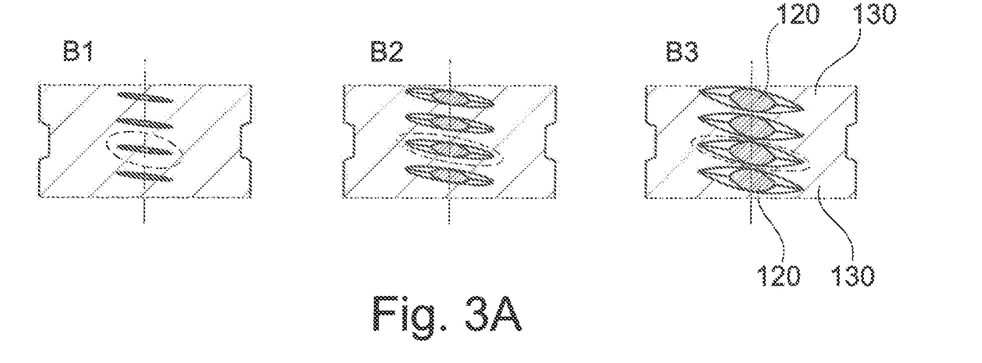
FIG. 3A shows longitudinal sections of the FIG. 1A mechanism at different distances from the axis of the screw, and shows curvilinear roller-nut contact interfaces.

As regards the roller-nut interface, three sections B1, B2, and B3 as defined above at respective ones of three distances DB1, DB2, and DB3 are shown in FIG. 3A, where DB1<DB2<DB3.

Figure 3B:
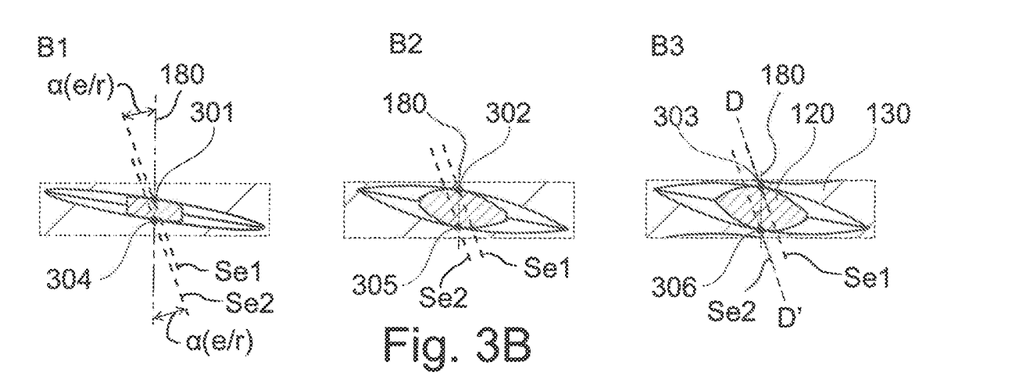
FIGS. 3B and 3C show, respectively, enlargements of the section views shown in FIG. 3A and a comparative example for a conventional situation of point contacts.

FIG. 3B shows enlargements of the regions surrounded by dashed lines in FIG. 3A, and shows the contact points 301, 302, and 303 in a first contact plane Se1 between a first flank of the thread of the roller 120 and the thread of the nut 130, and the contact points in a second contact plane Se2 between a second flank of the thread of the roller 120 and the thread of the nut 130, these contact points being marked by solid disks, at different distances from the axis of the screw 110. These contact points correspond to the intersections where the straight line segments of contact between the roller and the nut intersect the section planes.

Figure 4A:
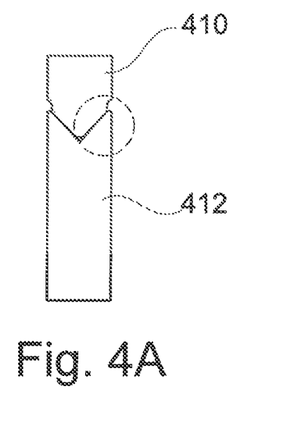
FIGS. 4A, 4B, 4C, and 4D show slanting sections on the section planes shown in FIGS. 2B and 3B.
Figure 4B:
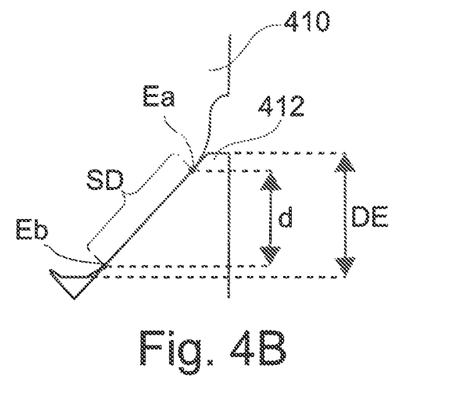

Slanting sections along the path CC' in FIG. 2B and along the path DD' in FIG. 3B are shown in FIGS. 4A and 4B.

FIGS. 4A and 4B serve to show both the screw-roller interface and also the roller-nut interface, the element 410 representing a portion of the roller and the element 412 representing a portion of the screw or a portion of the nut, interchangeably.

These sections are defined in such a manner as to show the straight line segments of contact between the roller and the screw and between the roller and the nut. As shown in FIGS. 4A and 4B, at the contact interface, the threads of the rollers have strictly straight profiles, and they come into contact with the threads of the screw and of the nut in a geometry of contacts having curvilinear segments, and, in this example, along straight line segments SD including the contact points 201 to 206 or 301 to 306 shown in FIG. 2B or FIG. 3B, respectively. The longer the straight line segment, the higher the load capacity of the mechanism.

The length of the segment of contact is naturally limited by the lengths of the flanks of the threads.

As indicated by FIG. 4A, the two opposite flanks of the threads of the rollers co-operate with the threads of the screw and of the nut in a contact geometry having a curvilinear segment, and more exactly along straight line segments.

Thus, two portions of the mutually facing flanks of a thread of the screw or of the nut are in contact with respective ones of two opposite flanks of the thread of a roller. In a contact plane (in this example, the plane of the figure), FIG. 4B shows that the profile of the element 410 and the profile of the element 412 are two complementary profiles, i.e. they are complementary to each other over the length of the straight line segment SD having ends Ea and Eb. The profiles may be described by a straight line over the length of said straight line segment and may thus be described by the same equation over the length of said straight line segment, so that the profiles make it possible to procure a geometry of contact that is not point contact, but rather that is curvilinear contact between the two elements 410 and 412. The screw-roller contact segments are part of the planes Sv1 and Sv2, which are contact planes and which, in accordance with the invention, are significantly offset from the longitudinal axis of the screw, i.e. are significantly distinct from the midplanes of the screw, as can be deduced from FIG. 2B in which three sections A1, A2, and A3 are shown, with section A1 being the deepest and section A3 being the furthest away from the axis 170 of the screw. It can be seen that points 201 to 203 and points 204 to 206 define contact segments that are in contact planes that are offset angularly by an angle α(v/r) relative to a midplane 180 of the mechanism, which midplane contains the longitudinal axis 170 of the screw and the longitudinal axis 175 of the roller in question, and thus that are offset angularly relative to the longitudinal axis 170 of the screw. In other words, the screw-roller contact segments do not lie within a midplane of the screw.

In accordance with the invention, the angle α(v/r) may lie in the range 0.5° to 45°, FIG. 2B showing a situation in which the angle is approximately 30°.

The roller-nut contact segments lie within the planes Se1 and Se2, which are contact planes and which are, in accordance with the invention, offset from the longitudinal axis of the screw, and distinct from but close to the midplanes of the screw, so that it is difficult to provide figures that show this characteristic. In FIG. 3B, it can be seen that points 301 to 303 and points 304 to 306 define contact segments that are in contact planes that are offset angularly by an angle α(e/r) relative to a midplane 180 of the mechanism, which midplane contains the longitudinal axis 170 of the screw and the longitudinal axis 175 of the roller in question, and thus that are offset angularly relative to the longitudinal axis 170 of the screw.

In accordance with the invention, the angle α(e/r) may lie in the range 0.5° to about 45°, while remaining, for any given roller screw mechanism, strictly less than the angle α(v/r), FIG. 2B showing a situation in which the angle is approximately 15°.

An engagement distance DE to which the threads of the rollers engage in the thread of the screw may be defined as being a difference in distance to the axis of the screw between the crest of the thread of a roller and the crest of the thread of the screw in a contact plane when the roller screw mechanism is assembled. The distance d in FIG. 4B shows the difference in distances to the longitudinal axis of the screw between the two ends Ea and Eb of the straight line segment of contact SD between the screw and one of the rollers when the elements 410 and 412 represent respectively a screw and a roller.

Similarly, an engagement distance DE to which the threads of the rollers engage in the thread of the nut may be defined as being a difference in distance to the axis of the screw between the crest of the thread of a roller and the crest of the thread of the nut in a contact plane. These distances correspond to DE in FIG. 4B.

If the sections A1 and A3 shown in FIG. 2B are separated by a distance representing at least 10% of the distance DE, then, in the situation of screw-roller contact, the difference in distances d to the longitudinal axis of the screw between the two ends Ea and Eb of the straight line segment of contact SD between the screw and one of the rollers is equal to at least 10% of the engagement distance DE. But the sections A1 and A3 may be separated by a distance of up to at least 40% of DE, at least 60% of DE, or at least 70% of DE, and the difference in distances d may then be equal respectively to at least 40% of DE, at least 60% of DE, or at least 70% of DE. An increase in d is accompanied by an increase in the load capacity of the roller screw, d having the engagement distance DE as its upper limit.

Similarly, if the sections B1 and B3 shown in FIG. 3B are separated by a distance representing at least 10% of the distance DE, then, in the situation of roller-nut contact, the difference in distances d to the longitudinal axis of the screw between the two ends Ea and Eb of the straight line segment of contact SD between one of the rollers and the nut is equal to at least 10% of the engagement distance DE. But the sections B1 and B3 may be separated by a distance of up to at least 40% of DE, at least 60% of DE, or at least 70% of DE, and the difference in distances d may then be equal respectively to at least 40% of DE, at least 60% of DE, or at least 70% of DE. In this example too, an increase in d is accompanied by an increase in the load capacity of the roller screw, d having the engagement distance DE as its upper limit.

It may be preferable to make provision for the load capacity between the screw and the rollers and the load capacity between the rollers and the nut to be equal to each other.

By way of comparison with mechanisms used hitherto that are based on point contact geometry, reference can be made to FIGS. 2C, 3C, 4E, and 4F, which are equivalent to FIGS. 2B, 3B, 4A, and 4B, but which show point contact rather than curvilinear contact geometry.

Figure 2C:
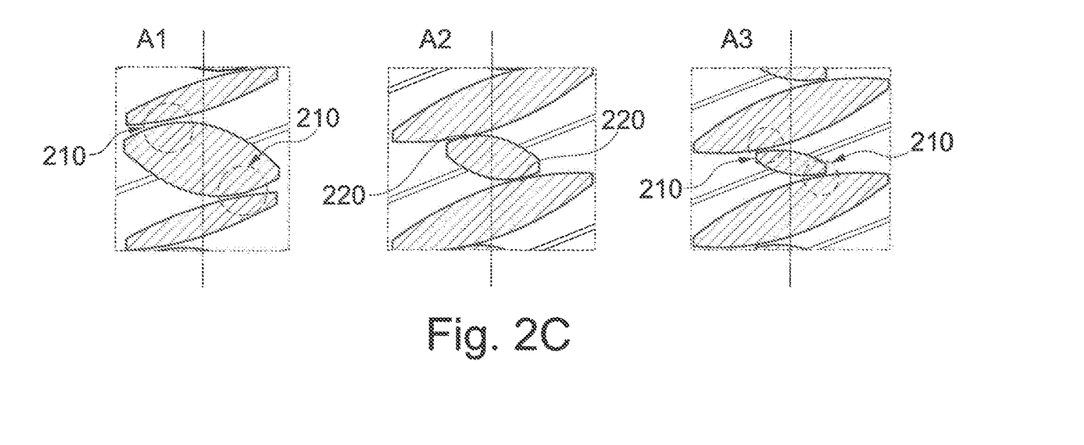

FIG. 2C shows that only one longitudinal section, namely section A2 in this example, can show point contact 220 between a roller and the screw. In sections closer to or further away from the axis of the screw than the section A2, such as sections A1 and A3, gaps 210 separate the roller from the screw.

Figure 3C:
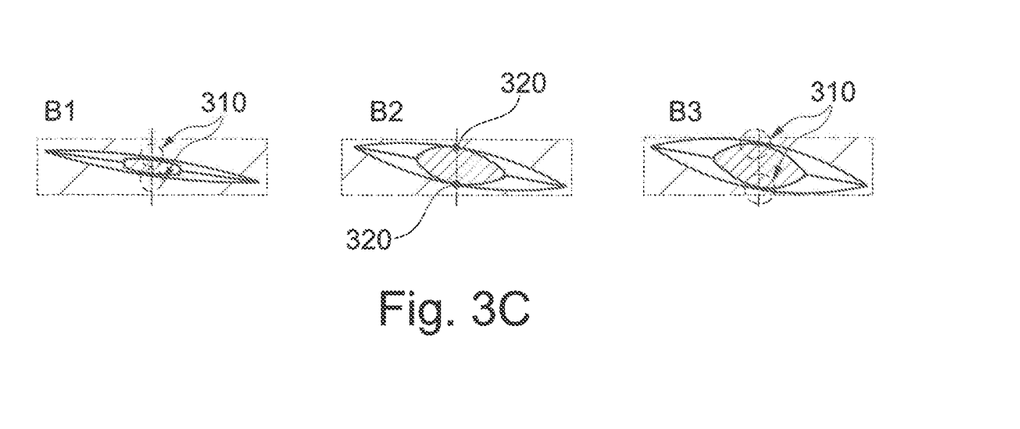

Similarly, FIG. 3C shows that only one longitudinal section, namely section B2 in this example, can show point contact 320 between a roller and the nut. In sections closer to or further away from the axis of the screw than the section B2, such as sections B1 and B3, gaps 310 separate the roller from the screw.

Figure 4C:
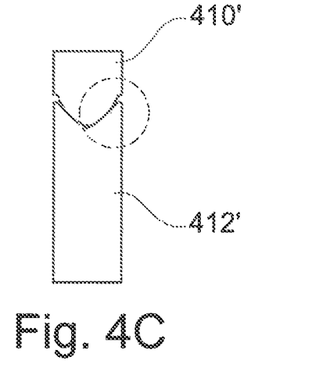
Figure 4D:
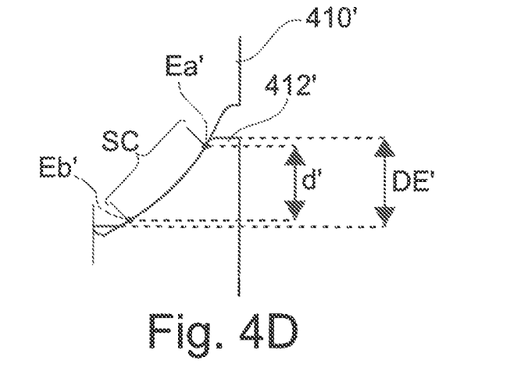
Figure 4E:
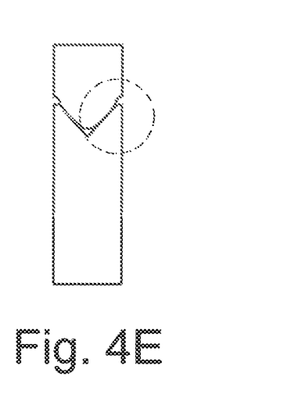
FIGS. 4E and 4F shows section views equivalent to those in FIGS. 4A and 4B, but in the conventional situation of a point contact.
Figure 4F:
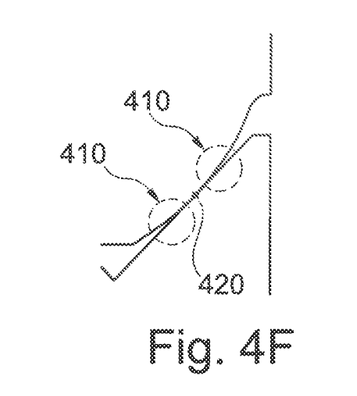

Thus, FIGS. 4E and 4F only make it possible to see a point contact 420 between the roller and the screw or between the roller and the nut, and not segments of curves or of straight lines as in the present invention. Gaps 410 corresponding to the gaps 210 and 310 shown respectively in FIG. 2C and in FIG. 3C flank the point contact 420.

It should be noted that contact interfaces can only strictly be considered as curvilinear in situations of zero load. When the load becomes non-zero, deformations of materials appear due to the stresses to which the elements are subjected and the contact interfaces then follow geometries that involve areas, and no longer lines.

Figure 5A:
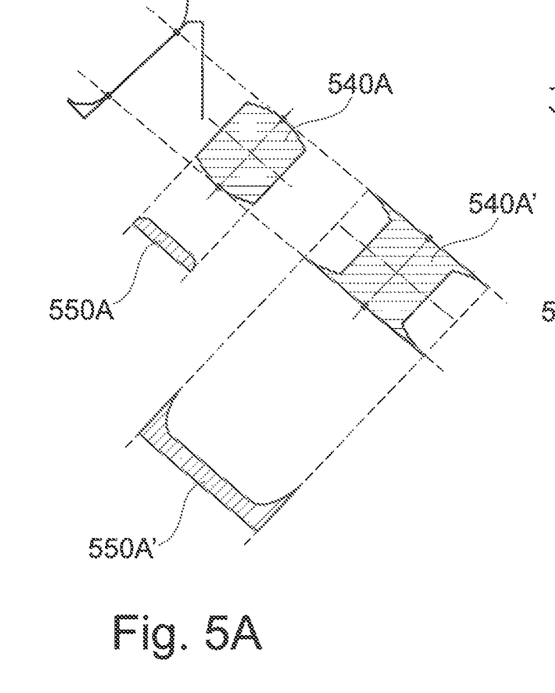
FIGS. 5A and 5B show contact areas and pressure distribution patterns in the situation of contacts under load respectively for curvilinear and point contact geometries.

In this embodiment, under load, the geometry of the contact interfaces can be likened to a rectangle or to the section of a key, depending on the situation. FIG. 5A shows a contact area 540A of shape that can be likened to a rectangle and an area 540A' that can be described as being the section of a key. These contact areas correspond to the pressure distribution patterns 550A and 550A', which have approximately constant pressure zones. It should be noted that in these situations, the contact is said to be "non-Hertzian" in that Hertz's theory that models the stresses between two objects in contact with each other does not apply.

Figure 5B:
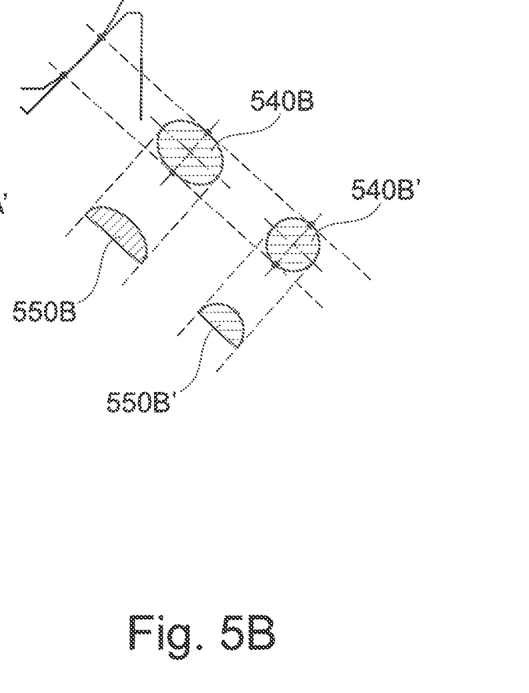

By way of comparison, FIG. 5B shows point contact situations for which the contact area forms an ellipse 540B or a circle 540B', with pressure distribution patterns 550B and 550B' that form caps. Here, Hertz's theory does apply.

Another aspect of the roller screw mechanism of the invention concerns the advance per turn of the screw. In a roller screw system, such advance is proportional to the diameter of the screw. In the conventional approach, based on point contacts, the advance cannot exceed the diameter of the screw.

A curvilinear contact geometry of the invention makes it possible to maintain the screw-roller and roller-nut contacts over ranges of geometries that are broader than with point contacts. Thus, not only can advances per turn be obtained that are equivalent to those obtained with the conventional approach having point contacts, but also advances per turn can be obtained that are greater than the diameter of the screw. The roller mechanism of the invention can thus offer advances per turn that are larger than one time the diameter of the screw, and up to four times the diameter of the screw.

Figure 5C:
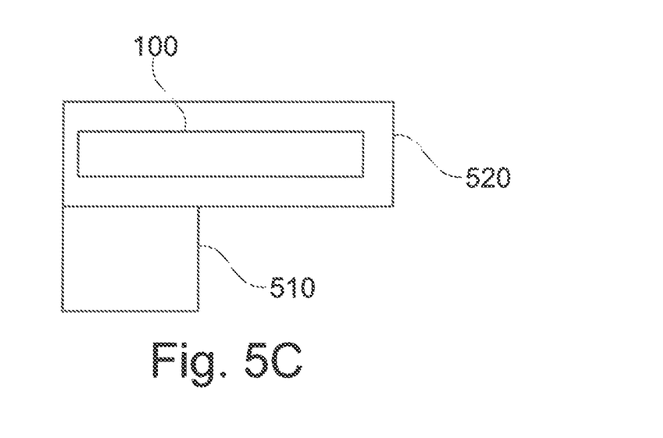
FIG. 5C diagrammatically shows an actuator including the roller screw mechanism shown in FIG. 1A.

An actuator shown diagrammatically in FIG. 5C takes advantage of the above-described roller screw mechanism 100 by coupling it to a mechanical drive system 510 via a coupling system 520. The mechanical drive system may, for example, be a manual drive system or it may include an electric motor.

DESCRIPTION OF A SECOND EMBODIMENT

The second embodiment differs from the first embodiment in that the threads of the rollers have concave or convex flanks and come into contact with the threads of the screw and of the nut along curve segments, rather than along straight line segments.

In the situation of contact between two helical surfaces (outside surface of a screw or of a roller or inside surface of a nut) taking place along a curve segment, the contact plane is the plane containing said curve segment. In the roller screw mechanism of the invention, this contact plane is distinct from the plane that is common to the longitudinal axes of the two helical surfaces. Unlike when the contact takes place along a straight line segment, there is no tangential plane common to the two helical surfaces and also containing said curve segment.

In this embodiment, when the threads of the rollers have concave flanks, the threads of the screw and of the roller have convex flanks. Conversely, when the threads of the rollers have convex flanks, the threads of the screw and of the roller have concave flanks. As in the first embodiment, the flanks of the threads of the rollers are complementary to the flanks of the threads of the screw and of the nut.

With the exception of FIGS. 4A and 4B and of the corresponding comments, reference may be made to the description of the first embodiment.

Conversely, reference is made to FIGS. 4C and 4D for examining the features of the second embodiment.

FIGS. 4C and 4D serve to show both the screw-roller interface and also the roller-nut interface for the second embodiment, the element 410' representing a portion of the roller and the element 412' representing a portion of the screw or a portion of the nut, interchangeably.

Unlike in the first embodiment, the screw-roller and roller-nut contacts take place along curve segments SC and not along straight line segments. However, as in the first embodiment, said curve segments lie in "contact planes" that are clearly distinct from the midplanes of the screw for the screw-roller contacts.

In a contact plane (in this example, the plane of the figure), FIG. 4D shows the profile of the element 410' and the profile of the element 412' complementary to each other over the length of the curve segment SC. The profiles can be described by two reciprocal curves in this plane and over the length of said curve segment: one of the two curves is convex, while the other of the two curves is concave, and they can be described by the same equation over the length of said curve segment, so that the profiles make it possible to obtain a contact geometry that, instead of being a point contact geometry, is a curvilinear segment geometry between the two elements 410' and 412'.

In accordance with the invention, the matching between the profiles of the rollers and of the screw at the contact zones is total, which means that the radii of curvature of the profiles of the roller and of the screw in the contact plane are exactly the same. Likewise, the matching between the profiles of the rollers and of the nut at the contact zones is total, which means that the radii of curvature of the profiles of the roller and of the nut in the contact plane are exactly the same.

This can be characterized by osculation, defined as one half of the ratio between the radius of curvature of the concave or convex profile of the screw or of the nut and the radius of curvature of the profile of the roller at the center of the contact. In the curvilinear contact geometry of this embodiment, the osculation is equal to 0.5.

Conversely, in a point contact geometry, the osculation can never be equal to 0.5, regardless of the profile, and is always strictly greater than 0.5.

An engagement distance DE' to which the threads of the rollers engage in the thread of the screw may be defined as being a difference in distance to the axis of the screw between the crest of the thread of a roller and the crest of the thread of the screw when the roller screw mechanism is assembled. The distance d' in FIG. 4D shows the difference in distances to the longitudinal axis of the screw between the two ends Ea' and Eb' of the curve segment of contact SC between the screw and one of the rollers when the elements 410' and 412' represent respectively a screw and a roller.

Similarly, an engagement distance DE' to which the threads of the rollers engage in the thread of the nut may be defined as being a difference in distance to the axis of the screw between the crest of the thread of a roller and the crest of the thread of the nut. These distances correspond to DE' in FIG. 4D.

If the sections A1 and A3 shown in FIG. 2B are separated by a distance representing at least 10% of the distance DE', then, in the situation of screw-roller contact, the difference in distance d' to the longitudinal axis of the screw between the two ends Ea' and Eb' of the straight line segment of contact SC between the screw and one of the rollers is equal to at least 10% of the engagement distance DE'. But the sections A1 and A3 may be separated by a distance of up to at least 40% of DE', at least 60% of DE', at least 70% of DE', or at least 80% of DE', and the difference in distances d' may then be equal respectively to at least 40% of DE', at least 60% of DE', at least 70% of DE', or at least 80% of DE'. An increase in d' is accompanied by an increase in the load capacity of the roller screw, d' having the engagement distance DE' as its upper limit.

Similarly, if the sections B1 and B3 shown in FIG. 3B are separated by a distance representing at least 10% of the distance DE', then, in the situation of roller-nut contact, the difference in distances d' to the longitudinal axis of the screw between the two ends Ea' and Eb' of the straight line segment of contact SC between one of the rollers and the nut is equal to at least 10% of the engagement distance DE'. But the sections B1 and B3 may be separated by a distance of up to at least 40% of DE', at least 60% of DE', at least 70% of DE', or at least 80% of DE', and the difference in distances d' may then be equal respectively to at least 40% of DE', at least 60% of DE', at least 70% of DE', or at least 80% of DE'. An increase in d' is, in this embodiment too, accompanied by an increase in the load capacity of the roller screw, d' having the engagement distance DE' as its upper limit.

It may be preferable to make provision for the load capacity between the screw and the rollers and the load capacity between the rollers and the nut to be equal to each other.

In this embodiment, under load, the geometry of the contact interfaces can be likened to a toroidal cap.

The invention claimed is:

1. A roller screw mechanism comprising:
a screw provided with an external thread;
a nut coaxially surrounding the screw and provided with an internal thread; and
rollers, each of which is provided with an external thread, each roller being interposed between the screw and the nut so that the threads of the rollers mesh with the threads of the screw and of the nut;
wherein the threads of the rollers are complementary to the threads of the screw and of the nut so that, at zero load, the threads of the rollers co-operate on both of their flanks with the threads of the screw and of the nut in a contact geometry having curvilinear segments; and
the rollers come into contact respectively with the screw and with the nut along contact segments lying in planes that are offset angularly relative to a midplane of the mechanism that contains a longitudinal axis of the screw and a longitudinal axis of the roller in question.

2. A roller screw mechanism according to claim 1, wherein, at the contact zones:
the threads of the rollers have straight profiles; and
the threads of the rollers come into contact with the threads of the screw and of the nut along straight line segments.

3. A roller screw mechanism according to claim 1, wherein, at the contact zones:
the threads of the rollers come into contact with the threads of the screw and of the nut along curve segments; and
the threads of the rollers have convex profiles and the threads of the screw and of the nut have concave profiles; or
the threads of the rollers have concave profiles and the threads of the screw and of the nut have convex profiles.

4. A roller screw mechanism according to claim 1, wherein an advance per turn of the mechanism lies in the range zero times the diameter of the screw to one time the diameter of the screw.

5. A roller screw mechanism according to claim 1, wherein an advance per turn of the mechanism lies in the range greater than one time the diameter of the screw to four times the diameter of the screw.

6. A roller screw mechanism according to claim 1, wherein if consideration is given to an engagement distance defined as a first difference in distances to the longitudinal axis of the screw between a crest of the thread of one of the rollers and a crest of the thread of the screw when the roller screw mechanism is assembled, and if consideration is given to a second difference in distances to the longitudinal axis of the screw between the two ends of the contact segment between the screw and one of the rollers, then said second difference in distances is equal to at least 10% of said engagement distance.

7. An actuator device comprising:
a roller screw mechanism comprising:
a screw provided with an external thread;
a nut coaxially surrounding the screw and provided with an internal thread; and
rollers, each of which is provided with an external thread, each roller being interposed between the screw and the nut so that the threads of the rollers mesh with the threads of the screw and of the nut;
wherein the threads of the rollers are complementary to the threads of the screw and of the nut so that, at zero load, the threads of the rollers co-operate on both of their flanks with the threads of the screw and of the nut in a contact geometry having curvilinear segments; and
the rollers come into contact respectively with the screw and with the nut along contact segments lying in planes that are offset angularly relative to a midplane of the mechanism that contains a longitudinal axis-of the screw and a longitudinal axis of the roller in question.

8. An actuator device according to claim 7, wherein, at the contact zones:
the threads of the rollers have straight profiles; and
the threads of the rollers come into contact with the threads of the screw and of the nut along straight line segments.

9. An actuator device according to claim 7, wherein, at the contact zones:
the threads of the rollers come into contact with the threads of the screw and of the nut along curve segments; and
the threads of the rollers have convex profiles and the threads of the screw and of the nut have concave profiles; or
the threads of the rollers have concave profiles and the threads of the screw and of the nut have convex profiles.

10. An actuator device according to claim 7, wherein an advance per turn of the mechanism lies in the range zero times the diameter of the screw to one time the diameter of the screw.

11. An actuator device according to claim 7, wherein an advance per turn of the mechanism lies in the range greater than one time the diameter of the screw to four times the diameter of the screw.

12. An actuator device according to claim 7, wherein if consideration is given to an engagement distance defined as a first difference in distances to the longitudinal axis of the screw between a crest of the thread of one of the rollers and a crest of the thread of the screw when the roller screw mechanism is assembled, and if consideration is given to a second difference in distances to the longitudinal axis of the screw between the two ends of the contact segment between the screw and one of the rollers, then said second difference in distances is equal to at least 10% of said engagement distance.

* * * * *